United States Patent [19]

Yamada

[11] 3,969,011

[45] July 13, 1976

[54] ATTACHMENT ASSEMBLY FOR PREVENTING IMPROPER POSITIONAL MOUNTING

[75] Inventor: Shinji Yamada, Yoyota, Japan

[73] Assignee: Toyota Jidosha Kogyo Kabushiki Kaisha, Japan

[22] Filed: Aug. 19, 1974

[21] Appl. No.: 498,622

[30] Foreign Application Priority Data

Aug. 22, 1973 Japan .......................... 48-97570[U]
June 22, 1974 Japan .......................... 49-72724[U]

[52] U.S. Cl. ................................ 339/125 R; 151/30
[51] Int. Cl.[2] .................... H02B 1/02; F16B 39/284
[58] Field of Search .................. 151/14 R, 7, 44, 30, 151/41.76, 30; 339/263 R, 125 R

[56] References Cited

UNITED STATES PATENTS

| | | | |
|---|---|---|---|
| 1,875,664 | 9/1932 | Schlage | 151/30 |
| 2,304,107 | 12/1942 | Leisure | 151/41.76 |
| 2,399,957 | 5/1946 | Tinnerman | 151/14 R |
| 2,633,886 | 4/1953 | Tinnerman | 151/30 |
| 3,323,768 | 6/1967 | Hennessey | 339/125 R |

*Primary Examiner*—Roy D. Frazier
*Assistant Examiner*—Thomas J. Holko
*Attorney, Agent, or Firm*—Toren, McGeady and Stanger

[57] ABSTRACT

An attachment assembly is provided, particularly for use in automobiles, wherein one of a pair of male and female connectors may be mounted in a desired position for engagement by the other connector. A nut mounted upon one said connector is adapted to be threadedly engaged by a bolt extending through a frame member. Resiliently deformable means are located on one side of the nut to prevent passage of the bolt through the nut in one direction from the side thereof upon which the deformable means are located thereby preventing improper positional mounting of the connector. When said one connector is properly located to have the bolt extend through the nut from the side thereof opposite the resiliently deformable means, the bolt, after passage through the nut, operates by further turning thereof to cause deformation of said resiliently deformable means to enable the proper, secure mounting of said connector upon said frame body.

3 Claims, 9 Drawing Figures

ATTACHMENT ASSEMBLY FOR PREVENTING IMPROPER POSITIONAL MOUNTING

BACKGROUND OF THE INVENTION

The present invention relates generally to an attachment assembly whereby one of a pair of electrical connectors may be appropriately mounted upon a frame member of an automobile or the like. The attachment assembly of the present invention is more particularly intended for use in mounting one of a pair of male and female plug connectors whereby a multiplicity of wires may be brought into appropriate electrical contact with each other. The attachment assembly involves utilization of a nut and bolt arrangement for mounting of the connector and includes means to prevent mounting of the connector in an inverse or improper position.

Automobile circuitry usually involves a multiplicity of wires extending in a complex pattern throughout the various sections of the vehicle in order to form the electrical circuits necessary for performing the various electrical functions required. In order to provide convenient means for mounting such wires on the body of an automobile during its assembly, a plurality of connectors are utilized at various locations in the automobile to enable those wires which extend in similar directions in general proximity with each other to be electrically joined at a common point. The connectors located at a given point of joinder will comprise a male connector or plug part and a female connector or receptacle part, with one of these two connector parts being attached to a portion of the vehicle body. The other part may then be suitably plugged into said one part to enable electrical interconnection of the plurality of wires which extend from each of the parts. It will be apparent that if the part which is to be mounted upon the vehicle body is positioned improperly, as might occur through carelessness or mistake of personnel performing the assembly operation, the electrical interconnections which are required for vehicle operation will be improperly made thereby causing serious misfunction of electrical vehicle accessories. In order to obviate such errors there is sometimes provided means for insuring that the mounting and interconnection of the connector parts is performed in an appropriate manner. Nevertheless, mistakes continue to occur and when they take place during the assembly line operations of vehicle manufacturers, they give rise to costly impairment and serious hindrance of subsequent operations. Thus, it is important that during the assembly of a vehicle electrical connector parts be mounted in a proper position in a correct manner without error.

The present invention is intended to provide a novel attachment assembly for connectors of the aforementioned type which will obviate the difficulties discussed above which may arise with conventional attachment means and which will insure avoidance of inverse or improper positional mounting of a connector part upon a portion of the vehicle body.

SUMMARY OF THE INVENTION

Briefly, the present invention may be described as an attachment assembly for mounting one of a pair of male and female connectors upon a frame portion of an automobile or the like in a manner to prevent improper positioning thereof. The assembly comprises, in combination, a threaded bolt, and a nut mounted on said one connector which is to be attached to the frame of the automobile, with the nut being positioned for threaded engagement by the bolt when the connector is mounted. The frame portion upon which the connector is to be mounted includes means through which the bolt may extend for releasable engagement therewith. The invention is particularly characterized by resiliently deformable means formed on said one connector and located proximate said nut on one side only thereof to insure that engagement of the bolt with the nut will occur only when the connector is properly located. The resiliently deformable means are configured to prevent the bolt from being engaged in the nut from the side thereof upon which said deformable means are located. When the bolt is passed first through the nut on the opposite side thereof to commence threaded interengagement; continued turning of the bolt will cause it to extend through the nut and into abutment with the deformable means. With the bolt thus engaged, the force of threading the bolt through the nut will cause deformation of the resiliently deformable means thereby enabling proper mounting engagement to be effected between the nut and the bolt only when the connector part is appropriately located.

The resiliently deformable means may comprise a thin-walled fin-like section having a slot defined therethrough. The slot is positioned to extend relative to the nut at a location whereby the bolt may pass generally centrally through the slot to cause deformation of the walls of the fin-like section on opposite sides of the slot. Because of the resilient nature of the fin-like section, a spring-like engagement occurs between the bolt and the fin-like section thereby providing a further mounting force in addition to the mounting provided by engagement of the bolt with the nut.

The various features of novelty which characterize the invention are pointed out with particularly in the claims annexed to and forming a part of this disclosure. For a better understanding of the invention, its operating advantages and specific objects attained by its use, reference should be had to the accompanying drawings and descriptive matter in which there is illustrated and described preferred embodiments of the invention.

DETAILED DESCRIPTION OF THE INVENTION

Figure 1:
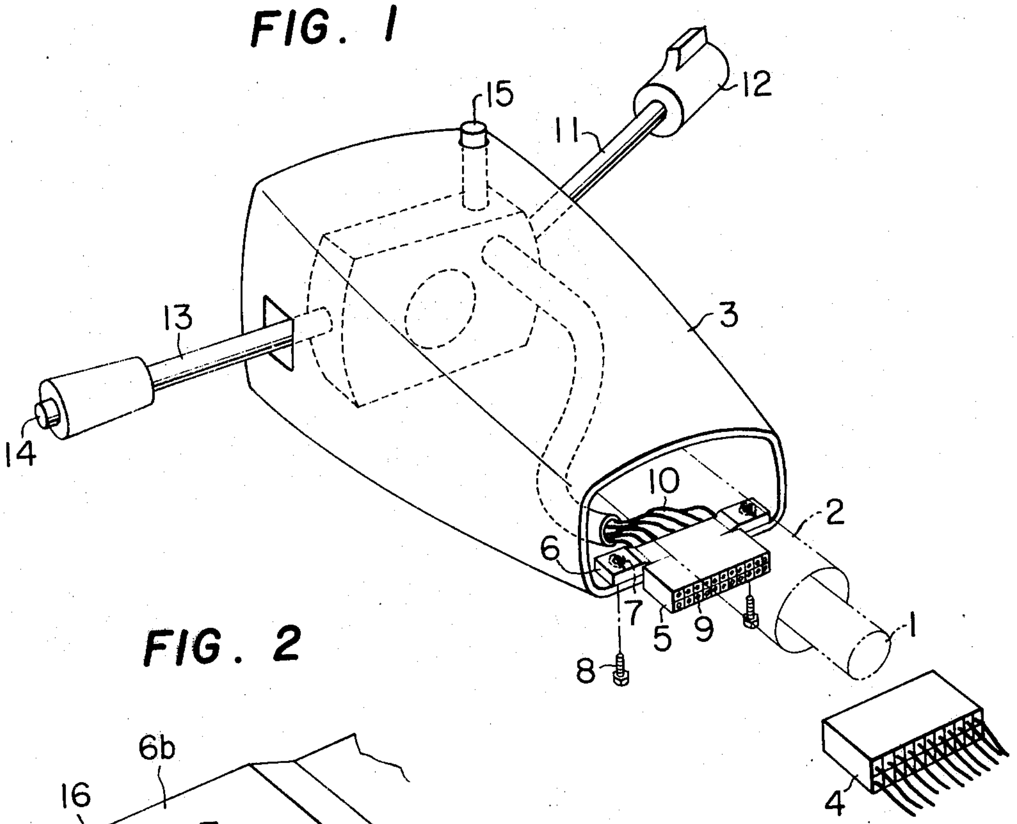
FIG. 1 is a perspective view showing the attachment assembly of the present invention together with associated parts.

Referring now to FIG. 1 of the drawings, an attachment assembly in accordance with a preferred embodiment of the present invention is illustrated as used in the steering column section of an automobile. As is well known such a steering column section will usually include a column cover 3 made of two similar halves mounted on the upper portion of a steering column 2 which extends over a steering shaft 1 connected from a steering wheel (not shown). To the lower end of the column cover 3 there is screwed a male connector part 5 which may be inserted into a female connector part 4 to establish electric connection between a power source and various operating units of the automobile. The male connector part 5 is fixed to the column cover 3 by a bolt 8 which may be threadedly engaged into a nut 7, which is fixed or otherwise mounted upon a flange 6 of the male connector part 5.

The parts 4 and 5 are adapted to form an interconnecting plug assembly for a plurality of wires 10 which extend from terminals 9 of the connectors and which are, in turn, selectively connected to a lever switch 11 for controlling a turn signal and dimmer units, a rotary switch 12 for controlling lights, a lever switch 13 for controlling a wiper unit, a button switch 14 for a washer unit, a button switch 15 for a reservoir, a switch (not shown) for a horn, and other similar vehicle accessories.

Figure 2:
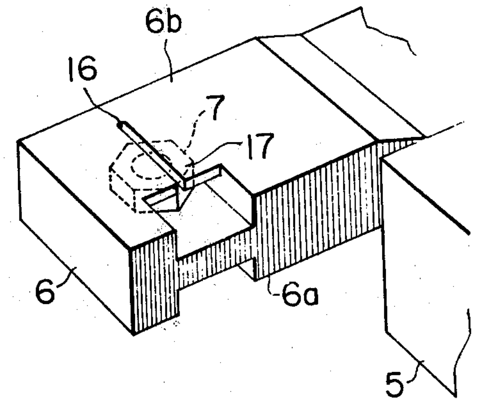
FIG. 2 is a perspective view showing in further detail and on an enlarged scale a principal part of the invention.

As best seen from FIG. 2, the flange 6 of the male connector part 5 includes a resiliently deformable portion comprising a fin-like extension 17 located at a portion of an upper surface *6b* that overlies or extends over the nut 7 embedded in the flange 6. The fin-like extension 17, which may be formed integrally on the upper surface *6b* of the flange 6 located on a side thereof opposite the side of a lower attachment surface *6a*, may be made of synthetic resin, a material similar to that from which the main body is made. The extension 17 is formed with an elongated slot 16 which is defined between a pair of thin-walled resilient sides of the extension 17. The slot 16 is arranged to be located in a generally centralized position over the nut 7.

Figure 3:
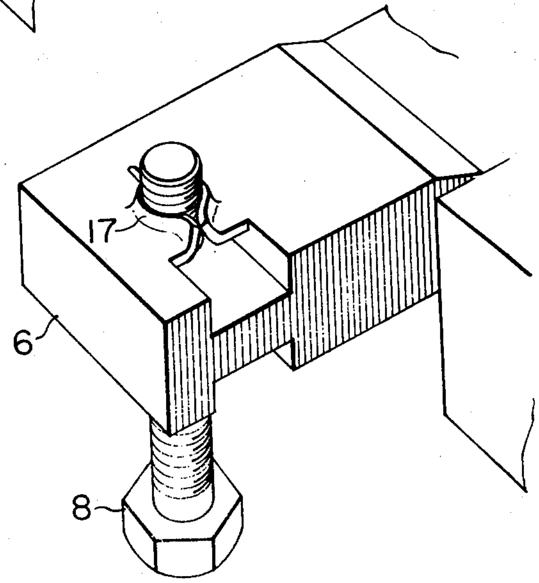
FIG. 3 is a perspective view illustrating the condition of the attachment assembly of the invention after passage of a bolt through portions thereof.

With such arrangement, if an attempt is made to mount the male connector part 5 in an inverse or incorrect position the bolt 8 which must be inserted from below the assembly can not be turned into the nut 7 since the fin-like extension 17 of the flange 6 is located to block engagement between the bolt 8 and the nut 7. Thus, it is only when the male connector part 5 has been mounted correctly with the upper surface *6b* facing upward, so that the nut 7 is located below the fin-like extension 17 as shown in FIG. 3, that the bolt 8 is permitted to come into engagement with the nut 7. It is to be noted that the fin-like extension 17 is forced upward and is ruptured along the slot 16 as the bolt 8 is turned into the nut 7. Because of the location of the slot 16, the threaded end of the bolt 8 will come into abutment with the extension 17 with the slot 16 located generally centrally of the bolt end, thereby facilitating mounting by deformation of the extension 17.

Thus, in accordance with the present invention, there is provided, an attachment assembly in which inverse mounting of the male connector part 5 is completely prevented by means of the fin-like extension 17. Such an arrangement may be very advantageously utilized in assembling operations. Further, the connector of the present invention has further advantageous features in that the means preventing inverse mounting can be constructed simply by making slight modifications to conventional parts. Furthermore, once the bolt 8 has been turned into the nut 7 under the correct mounting position of the male connector part 5, the bolt 8 tends to be held tightly in place since the fin-like extension 17 is forced into the thread of the bolt 8. Thus, not only do the resiliently deformable means of the present invention insure correct positional mounting, but they also provide an additional element to secure the mounted connector part in place.

Figure 4:
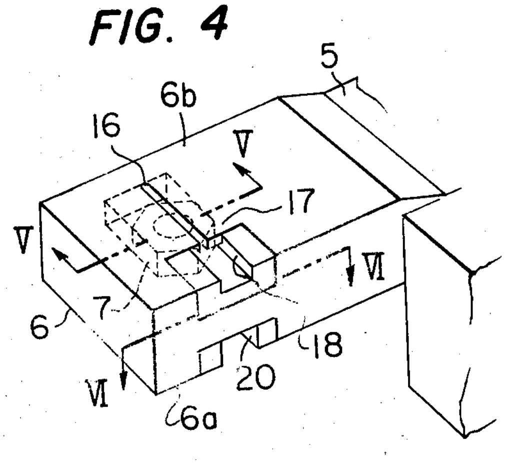
FIG. 4 is a perspective view showing another embodiment of the invention.
Figure 5:
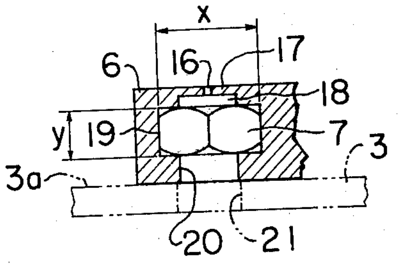
FIG. 5 is a sectional view taken along the line V—V of FIG. 4.
Figure 6:
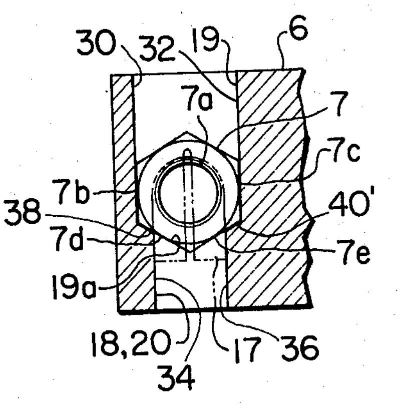
FIG. 6 is a sectional view taken along the line VI—VI of FIG. 4.

A second embodiment of the invention is depicted in FIGS. 4 – 6. In the second embodiment, the flange 6 is formed with a recess 19 within which a hexagonal nut 7 may be fitted and secured. A recess 19 is formed with a first pair of parallel walls 30, 32 extending rearwardly of the flange 6 and with a second more closely spaced pair of parallel walls 34, 36 extending to the opposite or forward side of the flange 6. The parallel walls 30, 32 are spaced apart a distance approximately equivalent to the thickness of the nut 7 taken across a pair of parallel faces *7b*, *7c*. The walls 30, 34 are joined by an abutment wall 38 which extends at an angle to abut a face *7b* of the nut 7 which is adjacent the face *7b*. The walls 32, 36 are joined by an abutment wall 40 which is formed to abut a face *7e* of the nut 7 which is adjacent the face *7c*.

The recess 19 is so dimensioned that its height $y$ is substantially equal to the height of the hexagonal nut 7 and so that its width $x$ is substantially equal to the thickness of the nut taken across the parallel sides *7b*, *7c*. It will be seen that the distance $x$ represents the spacing between the walls 30, 32. Since the inner end 19*a* of the recess 19 is tapered at the abutment walls 38, 40 in conformity with the adjacent sides *7d*, *7e* of the nut 7, the nut can be fitted into the recess 19 and made to occupy a desired predetermined position whereby it may be engaged by the bolt 8.

In the formation of the interior of the flange 6, another recess 18 having a smaller height and width is formed to extend from the front face of the flange 6 to the recess 19. The bottom of the recess 18 is in the same plane as the plane of the upper surface of the nut 7. The fin-like extension 17 extends over the nut 7 and over a portion of the recess 18. In the lower attachment surface *6a* of the flange 6, there is formed a groove 20 which extends from the front face of the flange 6 to the nut 7. The width of the groove 20 is slightly larger than the threaded bore *7a*of the nut 7.

Figure 7:
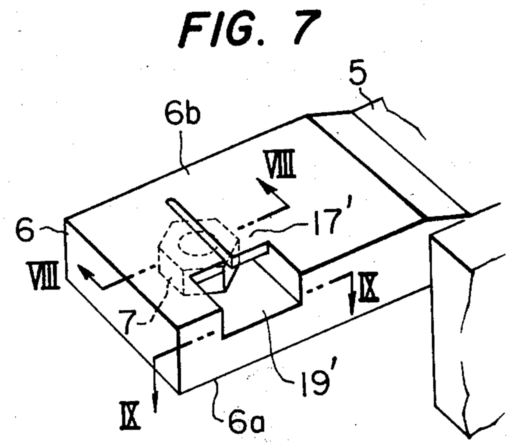
FIG. 7 is a perspective view illustrating still another embodiment of the present invention.
Figure 8:
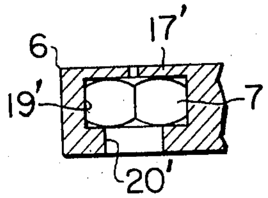
FIG. 8 is a sectional view taken along the line VIII—VIII of FIG. 7.
Figure 9:
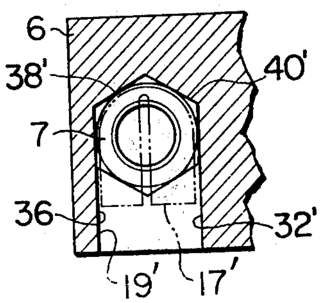
FIG. 9 is a sectional view taken along the line IX—IX of FIG. 7.

A third embodiment of the present invention is depicted in FIGS. 7 – 9 and in this embodiment only a recess 19', a portion of which corresponds to the recess 19 of FIGS. 4 – 6, is provided with the recess 18 of FIGS. 4 – 6 being eliminated. An opening 20' is formed at a position extending coaxially with the threaded bore *7a* of the nut 7 and a pair of parallel walls 30' and 32' extend to a pair of abutment walls 38' and 40'. Thus the nut may be inserted between the walls 30' and 32' with two of its faces abutting the walls 38' and 40'. It will be noted that in the third embodiment the recess 19' terminates and is closed at the walls 38', 40'.

While the preferred embodiments of the invention have been described in connection with a male connector part, it is to be understood that its utilization need not be so limited.

Furthermore, while specific embodiments of the invention have been shown and described in detail to illustrate the application of the inventive principles, it will be understood that the invention may be embodied otherwise without departing from such principles.

What is claimed is:

1. An attachment assembly for mounting one of a pair of male and female connectors to a frame body in a manner preventing improper positioning thereof, said assembly comprising a threaded bolt, means on said frame body through which said bolt may extend into engagement with said one connector for mounting said connector to said frame body, a nut mounted on said one connector and including a central threaded bore adapted to be threadedly engaged by said bolt, resiliently deformable means fixed relative to said one connector and located proximate said nut on one side thereof, said resiliently deformable means being configured to prevent threaded engagement of said nut by said bolt from the side thereof upon which said deformable means are located but to permit said bolt to become threadedly engaged with said nut when said bolt is inserted from the opposite side thereof, with said bolt acting to cause resilient deformation of said deformable means as said bolt is turned in threaded engagement with said nut to extend first through said nut and then into abutment with said deformable means thereby to permit secure threaded engagement between said bolt and said nut, said assembly being configured to permit said one connector to be mounted upon said frame body only when positioned relative thereto in a manner to permit said bolt to pass through said means on said frame body through which said bolt may extend into engagement with said connector and subsequently through said nut from the side thereof opposite the side upon which said resiliently deformable means are located, a flange extending from said one connector upon which said nut and said resiliently deformable means are located, means defining in said flange a recess having at least a pair of parallel walls within which said nut is fitted, said nut including at least a pair of parallel walls cooperating with said parallel walls of said recess to prevent rotation of said nut within said recess, said flange being positioned to extend relative to said means on said frame body through which said bolt may extend into engagement with said one connector to permit mounting of connector upon said frame body in a desired position by threaded engagement of said nut by said bolt, said resiliently deformable means comprising a thin-walled fin-like section extending from said connector and integrally formed therewith having a slot defined therein, said slot having a width less than the crest diameter of said central threaded bore and being located to extend relative to said nut to be engaged generally centrally by the threaded end of said bolt after passage thereof through said nut, said fin-like section being configured to be deformed by passage of said bolt therethrough in a manner to create a resilient engaging force between said fin-like section and said bolt.

2. An assembly according to claim 1 wherein said nut is formed with a hexagonal configuration having at least two opposed parallel faces and wherein said flange is formed with a recess for receiving said nut therein, said recess extending to one side of said flange with a formation defined by a first pair of parallel walls adapted to receive said nut therebetween, said first parallel walls being spaced apart a distance approximately equivalent to the thickness of said nut taken across said parallel faces, said recess extending to a side of said flange opposite said one side with a formation defined by a second pair of parallel walls spaced closer together than said first pair of parallel walls, with each of said first and second parallel walls being joined by an abutment wall extending therebetween at an angle to abut a face of said nut adjacent one of said parallel faces whereby said nut may be located in said recess by insertion between said first pair of parallel walls into abutment with said abutment walls.

3. An assembly according to claim 1 wherein said nut is formed with a hexagonal configuration having at least two opposed parallel faces and wherein said flange is formed with a recess extending to one side thereof with a formation defined by a pair of parallel walls spaced apart a distance equivalent to the thickness of said nut taken across said parallel faces, said recess being closed interiorally of said flange at a pair of abutment walls each extending from each of said parallel walls at an angle to abut a face of said nut adjacent one of said parallel faces whereby said nut may be located within said recess by insertion between said first pair of parallel walls into abutment with said abutment walls.

* * * * *